Oct. 7, 1930. J. P. TARBOX 1,777,455
METHOD OF MAKING HUBS
Filed June 6, 1929

*INVENTOR.*

Patented Oct. 7, 1930

1,777,455

UNITED STATES PATENT OFFICE

JOHN P. TARBOX, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

METHOD OF MAKING HUBS

Application filed June 6, 1929. Serial No. 368,981.

The fabrication of hubs the opposite ends of which differ substantially in diameter presents peculiar difficulties especially when the end of larger diameter is very considerably larger than the end of smaller diameter. With the object of prime economy and material I propose to fabricate such a hub of sections of tubing of differing diameters corresponding so closely as fabrication methods admit with the diameter of the respective hub sections, to externally flange an end of each of the sections of different diameter, and butt weld the periphery of the flange on the section of smaller diameter substantially to the root of the flange on the section of larger diameter.

My invention comprises an improvement over that disclosed in the application of Warren H. Farr, Serial No. 358,523, filed April 27, 1929.

The process is shown in the accompanying drawings in which—

Figure 1:
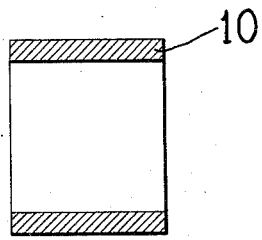
Figure 2:
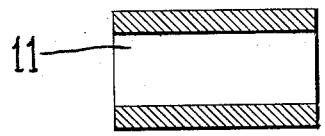
Figure 3:
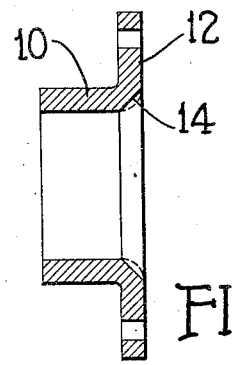
Figure 4:
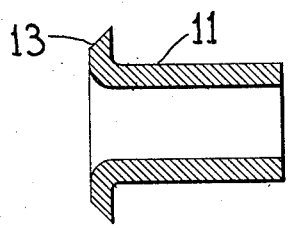
Figure 5:
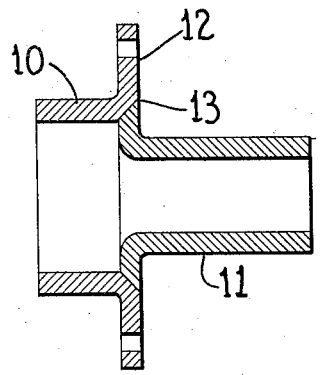

Figures 1 and 2 show in axial cross section the sections of tubing of different diameter employed, Figures 3 and 4 show this section as externally flanged on an end, and Figure 5 shows them butt welded together.

The process is so clearly depicted in the drawings as to need substantially no description. 10 and 11 are the sections of tubing of different diameter as shown departing very considerably in diameter. 12 and 13 are the flanges formed respectively on an end thereof. These shown are radial flanges projecting externally. They may be formed by any known processes. At the root 14 the apex of the angle formed between section 10 and its flange 12 is beveled by machining or otherwise to receive complementally a bevel formed on the periphery of the flange 13. The butt weld is then made by axial relative movements of the parts.

Obviously there is no waste of metal except that which may be machined to prepare the parts for the butt weld. Obviously also the flanging operation of the sections of tubing becomes very simple since the gross height of the radial flange of the hub at large is divided between the two sections 10 and 11. The radial flange of the hub therefore embodying the parts 12 and 13 may be made of more uniform dimensions and of generally more sturdy proportions for a given gauge of tubing.

The modifications of which my invention may be found susceptible I expect to be covered in the annexed claims.

What I claim as new and useful is:—

1. The method of making hubs the opposite ends of which are of different diameter which consists in employing sections of tubing of different diameter flanging an end of each section of tubing of different diameter and butt welding the perimeter of the flange of the section of small diameter to the root of the flange of the section of larger diameter.

2. The method of making hubs having portions of different diameter which consists in employing for the fabrication of the portions of different diameter sections of tubing of different diameter, flanging an end of each tubing section outwardly, and then butt welding the periphery of the flange of the section of smaller diameter substantially to apex of the angle formed between the section of larger diameter and its flange.

In testimony whereof he hereunto affixes his signature.

JOHN P. TARBOX.